F. L. FERNANDEZ.
VEHICLE WHEEL.
APPLICATION FILED MAR. 1, 1918. RENEWED APR. 17, 1920.
1,340,944.
Patented May 25, 1920.
3 SHEETS—SHEET 2.
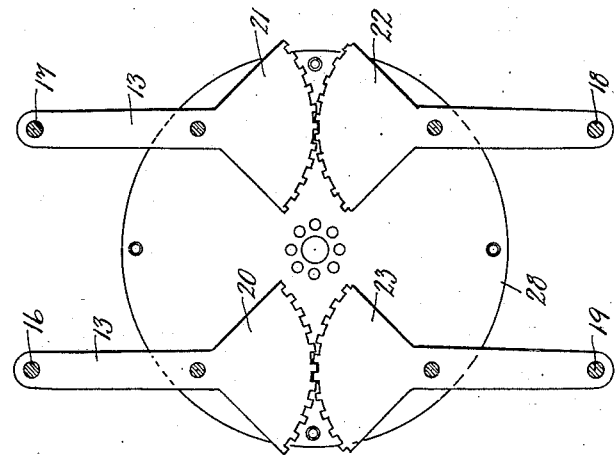
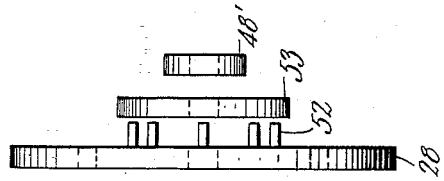
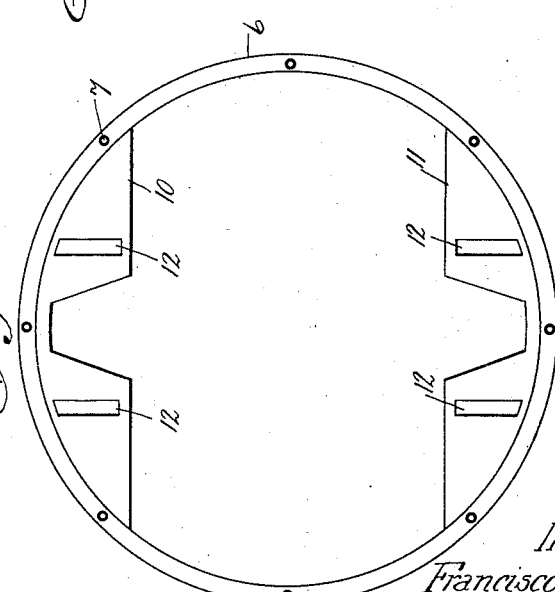
INVENTOR
Francisco López Fernández
by
Bingly
Attorney F. L. FERNANDEZ.
VEHICLE WHEEL.
APPLICATION FILED MAR. 1, 1918. RENEWED APR. 17, 1920.

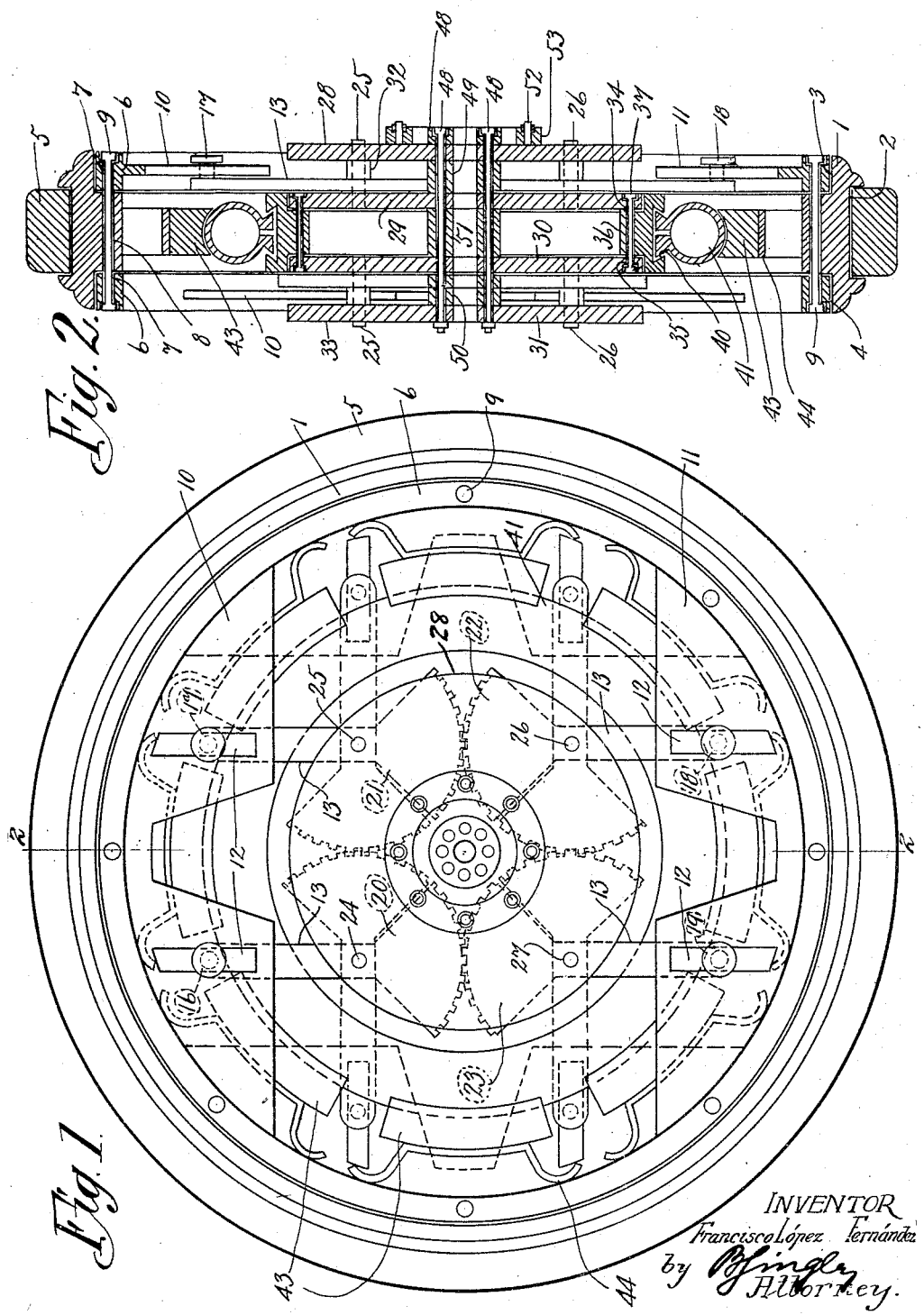

1,340,944.

Patented May 25, 1920.

INVENTOR
Francisco López Fernández
by
Attorney

UNITED STATES PATENT OFFICE.

FRANCISCO LÓPEZ FERNÁNDEZ, OF HABANA, CUBA.

VEHICLE-WHEEL.

1,349,944.  Specification of Letters Patent.  Patented May 25, 1920.

Application filed March 1, 1918, Serial No. 219,803. Renewed April 17, 1920. Serial No. 374,777.

*To all whom it may concern:*

Be it known that I, FRANCISCO LÓPEZ FERNÁNDEZ, No. 11 Mercaderes, city of Habana, island of Cuba, have invented certain new and useful Improvements in Vehicle-Wheels, of which the following is a specification.

This invention relates to improvements in wheels, and particularly to improvements in wheels for power vehicles and the like.

An object of the invention is to combine with the hub of the wheel a yielding annular member, and to support upon this yielding annular member a rim, preferably also of resilient or yielding material, but impervious to sharp foreign bodies which would be adapted to penetrate the casing of a pneumatic tire or the like.

Another object of the invention is to provide a vehicle wheel in which a solid rim is yieldingly supported on a pneumatic tire, which last named tire, however, is not brought into contact with the road surface over which the vehicle is traveling.

Another object of the invention is to provide, in combination with a pneumatic tire, a plurality of spring elements resting on the outer surface of the tire and supporting in their turn a rim provided with a tread surface.

Another object of the invention is to combine with a pneumatic tire which is supported in the wheel at a distance from the road surface, an outer rim forming the tread member of the vehicle and yieldingly connected with said inner tire, and means for transmitting relative motion of one portion of said rim and tire to other portions of the same.

With these and other objects in view, an embodiment of the invention is described in the following specification and illustrated in the accompanying drawing, and the novel features thereof are particularly pointed out in the appended claims.

In the drawings—

Figure 1 is a side elevation of the complete vehicle wheel;

Fig. 2 is a central section through the same on line 2—2 of Fig. 1;

Fig. 3 is a side elevation of the member supporting the outer solid rim;

Fig. 4 is a side elevation of several detail elements serving for uniformly transmitting movement of one of the relatively movable parts to another one;

Fig. 5 is an end elevation of a plurality of disk elements for supporting the pneumatic tire and a brake element;

Figure 6:
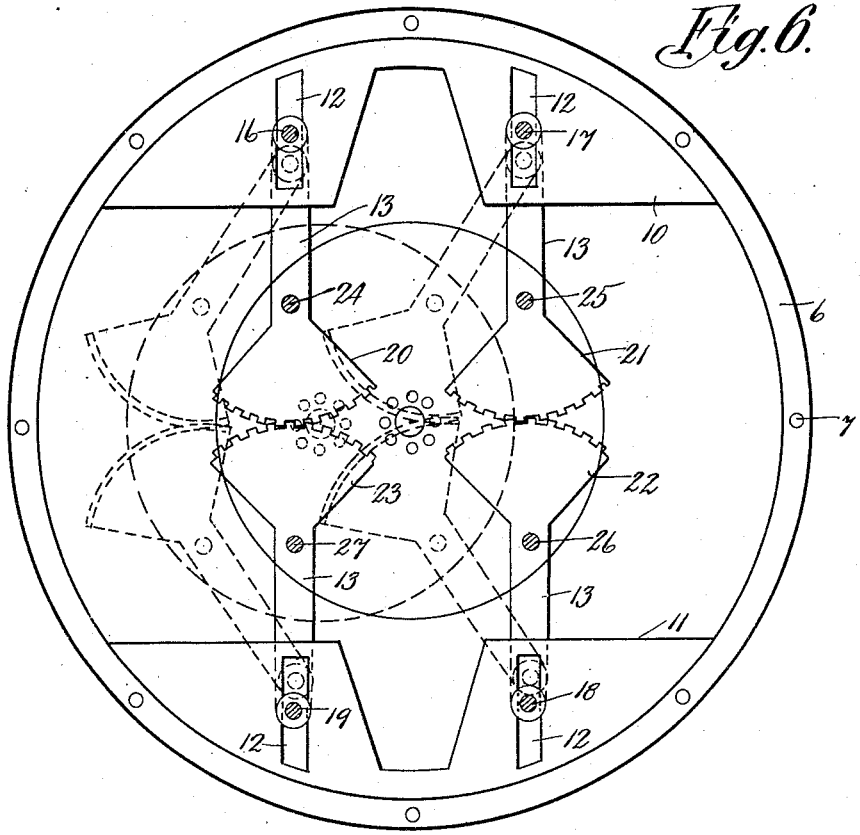
Fig. 6 shows, diagrammatically and in an exaggerated scale, the displacement of an inner felly with respect to an outer felly.

The felly 1 of the wheel is provided on its outer circumference with a central circumferential grove 2, and at opposite sides with annular grooves 3 and 4, the outer circumferential groove serving as a seat for a tread 5, which may be made of yielding material, like rubber, but which also may be made of rigid material impervious to the pressure of sharp implements or the like. The annular grooves 3 and 4 at the side surfaces of the felly 1 serve as seats for annular members 6, which are fitted into these grooves, and which are provided at suitably spaced intervals with openings 7, registering with the openings 8, passing through the central portion of the felly 1 so as to permit the insertion of bolts 9, whereby the ring members 6 and the felly 1 are united. From Fig. 3 it may be seen that the annular members 6 are each provided with oppositely located segments 10 and 11, having parallel inner edges, and each provided with a pair of slots 12, which slots extend through the segments in a direction at right angles to the inner edges of said segments. The slots 12 of the segments 10 and 11 in the annular members 6 serve as guiding means for bolts 16, 17, 18, and 19, which are located at the outer ends of intermeshing gear sectors 20, 21, and 22, 23 respectively. Each of these gear sectors is provided with a stem 13, having at its outer end the bolt 16, 17, 18, or 19 respectively, and being pivotally supported near its inner end by means of one of the pivot pins 24, 25, 26, and 27 on disks 28, 29, 30, and 31. By reference to Fig. 2 it will be seen that the two disks 28 and 31 are arranged at opposite sides of the wheel, while the disks 29 and 30 are located between the outer disks 28 and 31 but suitably spaced from each other. The support of the stems 13 of the gear sectors at suitable distance from the outer disks 28 and 31 is effected respectively by means of spacers 32 and 33, which surround the pivot pins 24, 25, 26 and 27.

The two inner disks 29 and 30 are provided near their circumference with a plurality of equally spaced openings 34 and 35, adapted to receive bolts 37, which also pass through the central portion of an inner rim 36, which is constructed similar to the outer rim 1, and is provided with an undercut central groove 40 for receiving a tire 41, and with annular shoulders which are in engagement with the outer circumference of the two disks 29 and 30. The four disks 28, 29, 30, and 31 are furthermore held in suitable axial alinement by means of bolts 48, passing through suitable openings near the central portion of said disks, said bolts being surrounded in the interspace between adjacent disks 28 and 29 by sleeves 49, in the interspace between the inner disks 29 and 30 by the spacers 51, and in the inner space between the two other disks 30 and 31 by spacers 50. The heads of the bolts 48 are inserted in a ring 48' at the side of the disk 28 and the opposite ends of the bolts are equipped with nuts or other holding members, as shown in Fig. 2.

Owing to the connection of the outer felly 1 with the carriers 29 and 30 of the inner felly 36, it is obvious that a movement of the outer felly with respect to the special carriers 29 and 30 would be transmitted to the inner felly 36. The means for transmitting this movement uniformly over the entire circumference of the inner felly is formed by paired gear sets which are pivotally mounted on the carriers 29 and 30 of the inner felly, and which are guided in the segments 10 and 11 forming part of the outer felly.

Figure 7:
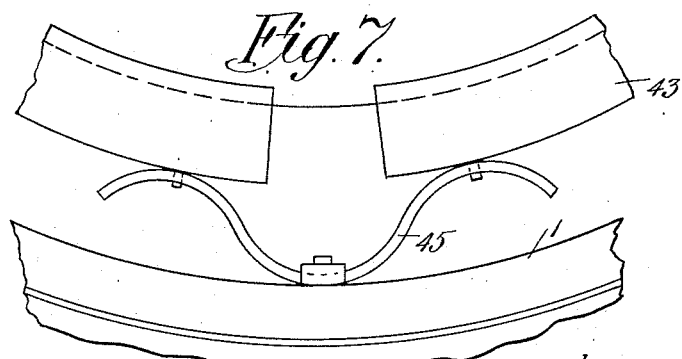
Fig. 7 is a side elevation of a portion of a support slightly modified from that shown in Fig. 1.

For the purpose of distributing the tractive force from the outer rim uniformly to the inner pneumatic tire 41, a plurality of blocks 43 are uniformly distributed over the outer circumference of the pneumatic tire 41 without, however, being normally in contact with each other. Leaf springs 44, which are rigidly secured to said blocks 43, rest with their ends on the inner surface of the outer rim 1 and thereby prevent excessive movement of the inner tire with respect to the outer tread member 5 without, however, decreasing the capacity of the inner tire element to absorb the shocks which in the travel of the vehicle must be taken up by the outer tread member 5. In the modification of the shock absorbers illustrated in Fig. 7, springs 45 are secured to the inner surface of the outer rim 1, and are in sliding engagement at their ends with each of a pair of adjacent blocks 43, serving for absorbing the shocks on the outer tread member.

The disk 28, which may be considered as a disk located close to the body of the vehicle, may be provided with a plurality of projecting pins 52, to which a ring 53 or the like may be secured, serving for the attachment of a brake drum (not shown).

Fig. 6 shows, in an exaggerated scale, the relative displacement of the supporting member 29 for the inner rim with respect to the carrier 6 of the outer rim. It will be noticed that, owing to the mutual engagement of the gear sectors, and owing to the distribution of these gear sectors in the manner indicated in Fig. 1, a displacement of the inner rim with respect to the outer rim is possible, which displacement will be partly counteracted, owing to the provision of the blocks 43 and the shock absorbing springs 44. From Fig. 1 it will be noticed that the stems of the gear sectors on one side of the wheel are arranged at a right angle to the stems of the gear sectors at the opposite side of the wheel. It will also be obvious that, in spite of maintaining the same resiliency which ordinarily is due to the provision of pneumatic tires on vehicles, the dangers to which pneumatic tires of this character are exposed are minimized in the present invention.

I claim:

1. In a vehicle wheel, the combination of an outer tread member, a felly for the outer tread member, segments attached to said felly, said segments being provided with parallel slots, an inner yielding member, disks supporting said inner yielding member on the axle of the wheel, links pivotally mounted on said disks, and guide pins connected with said links, said guide pins being movably inserted into the slots of said segments.

2. In a vehicle wheel, the combination of an outer tread member, a felly for the same, segments attached to said felly, a pneumatic tire, disks supporting said pneumatic tire, paired links pivotally attached to said disks and guided in a rectilinear path on said segments, and gear sectors connected with the link of each pair and intermeshing with each other, said gears being adapted to cause, upon movement of one of said links, an equivalent movement of the other link of said pair in the same direction.

3. In a vehicle wheel, the combination of an outer tread member, a felly supporting the same, segments attached to said felly, a plurality of disks concentrically disposed with respect to said felly, a pneumatic tire supported by said disks, links mounted on the outer surface of said disks, pivotally connected thereto and longitudinally guided in said segments, and additional disks rigidly connected with said first named disks and mounted at the outer surface of said links.

4. In a vehicle wheel, the combination of an outer tread member, a felly for the same, a pair of rings rigidly connected with said felly at opposite sides of the same, segments secured to said rings, a pair of disks resiliently and normally concentrically supported with respect to said rings, a plurality of paired links pivotally mounted on each disk and slidably guided on said segments, and another pair of disks rigidly connected with said first named disks, said links being located on opposite sides of said first named disks and between said first named disks and said second named disks.

5. In a vehicle wheel, the combination of an outer tread member of solid rubber, a felly for the same, rings connected with said felly, segments attached to said rings, said segments being provided with slots, the slots in the segments of one ring being arranged at a right angle to the slots in the segments of the other ring, disks normally concentrically disposed with respect to the felly, a plurality of links connected with said disks and guided in said slots, gear sectors connected with the links and pivotally connecting said links in couples, a pneumatic tire supported on said disks, and a plurality of yielding connections movably mounted on said tire and interposed between said tire and said felly.

Signed at Habana, Cuba, this eighth day of February, 1918.

FRANCISCO LÓPEZ FERNÁNDEZ.